United States Patent
Sakaguchi et al.

(10) Patent No.: US 9,972,818 B2
(45) Date of Patent: May 15, 2018

(54) LITHIUM ION SECONDARY BATTERY AND METHOD FOR MANUFACTURING THE SAME

(71) Applicant: Automotive Energy Supply Corporation, Zama-Shi, Kanagawa (JP)

(72) Inventors: Shinichiro Sakaguchi, Zama (JP); Aika Kimura, Zama (JP); Masatomo Mizuta, Zama (JP)

(73) Assignee: Automotive Energy Supply Corporation, Zama-Shi, Kanagawa (JP)

( * ) Notice: Subject to any disclaimer, the term of this patent is extended or adjusted under 35 U.S.C. 154(b) by 0 days. days.

(21) Appl. No.: 15/065,058

(22) Filed: Mar. 9, 2016

(65) Prior Publication Data
US 2016/0285066 A1 Sep. 29, 2016

(30) Foreign Application Priority Data
Mar. 25, 2015 (JP) ................................. 2015-062115

(51) Int. Cl.
| | |
|---|---|
| *H01M 2/18* | (2006.01) |
| *H01M 2/14* | (2006.01) |
| *H01M 2/16* | (2006.01) |
| *H01M 10/0525* | (2010.01) |
| *H01M 10/0585* | (2010.01) |
| *H01M 10/04* | (2006.01) |

(52) U.S. Cl.
CPC .............. *H01M 2/18* (2013.01); *H01M 2/145* (2013.01); *H01M 2/1653* (2013.01); *H01M 2/1673* (2013.01); *H01M 10/04* (2013.01); *H01M 10/0525* (2013.01); *H01M 10/0585* (2013.01)

(58) Field of Classification Search
None
See application file for complete search history.

(56) References Cited

U.S. PATENT DOCUMENTS

2013/0143089 A1 6/2013 Teshima et al.

FOREIGN PATENT DOCUMENTS

| EP | 1619733 A1 * | 1/2006 | .......... H01M 2/0275 |
|---|---|---|---|
| JP | H1067870 A | 3/1998 | |
| JP | 2008140551 A * | 6/2008 | |
| JP | 2012054194 A | 3/2012 | |
| JP | 2013118057 A | 6/2013 | |

OTHER PUBLICATIONS

JP2006-324095 to Teshima (2006) English machine translation.*
JP 2008140551 A—2008—English Machine Translation.*
Extended European Search Report dated Aug. 10, 2016 for the corresponding European Patent Application No. 16159709.1.

* cited by examiner

*Primary Examiner* — Lucas J. O'Donnell
(74) *Attorney, Agent, or Firm* — Troutman Sanders LLP

(57) ABSTRACT

A lithium ion secondary battery according to an embodiment of the present disclosure includes: a positive electrode extending along a first direction; a negative electrode extending along the first direction and disposed opposite to the positive electrode along a second direction orthogonal to the first direction; and a separator with a crosslinked structure, extending along the first direction and provided between the positive electrode and the negative electrode. The separator includes an opposite region opposite to the positive electrode and the negative electrode along the second direction, and a surplus region not opposite to the positive electrode and/or the negative electrode along the second direction, and the surplus region has lower porosity than the opposite region.

4 Claims, 5 Drawing Sheets

LITHIUM ION SECONDARY BATTERY AND METHOD FOR MANUFACTURING THE SAME

CROSS-REFERENCE TO RELATED APPLICATION

This application claims priority from Japanese Patent Application No. 2015-062115, filed with the Japan Patent Office on Mar. 25, 2015, the entire content of which is hereby incorporated by reference.

BACKGROUND

1. Technical Field

The present disclosure relates to a lithium ion secondary battery and a method for manufacturing the same.

2. Related Art

A lithium ion secondary battery includes a power generating element including a stack of a positive electrode, a separator, and a negative electrode. The separator has a function of holding an electrolyte solution for securing the lithium ion conduction between the positive electrode and the negative electrode, and a function of preventing the short-circuiting between the positive electrode and the negative electrode. In order to achieve the functions, the separator is formed to be sufficiently large relative to a region opposite to the positive electrode and the negative electrode (hereinafter referred to as "opposite region") (that is, the separator is formed to have a sufficient "surplus region").

As the lithium ion secondary battery is used, the electrolyte solution held in the opposite region of the separator moves to the surplus region (i.e., the region not opposite to the positive electrode and/or the negative electrode). When the electrolyte solution has moved to the surplus region, the capacity of the lithium ion secondary battery is decreased. In order to avoid this decrease in capacity of the lithium ion secondary battery, the porosity of the surplus region is set smaller than the porosity of the opposite region (i.e., a region with low porosity (hereinafter referred to as "low-porosity region") is formed in the surplus region) (see JP-A-2013-118057).

SUMMARY

A lithium ion secondary battery according to an embodiment of the present disclosure includes: a positive electrode extending along a first direction; a negative electrode extending along the first direction and disposed opposite to the positive electrode along a second direction orthogonal to the first direction; and a separator with a crosslinked structure, extending along the first direction and provided between the positive electrode and the negative electrode. The separator includes an opposite region opposite to the positive electrode and the negative electrode along the second direction, and a surplus region not opposite to the positive electrode and/or the negative electrode along the second direction, and the surplus region has lower porosity than the opposite region.

DETAILED DESCRIPTION

Figure 1:
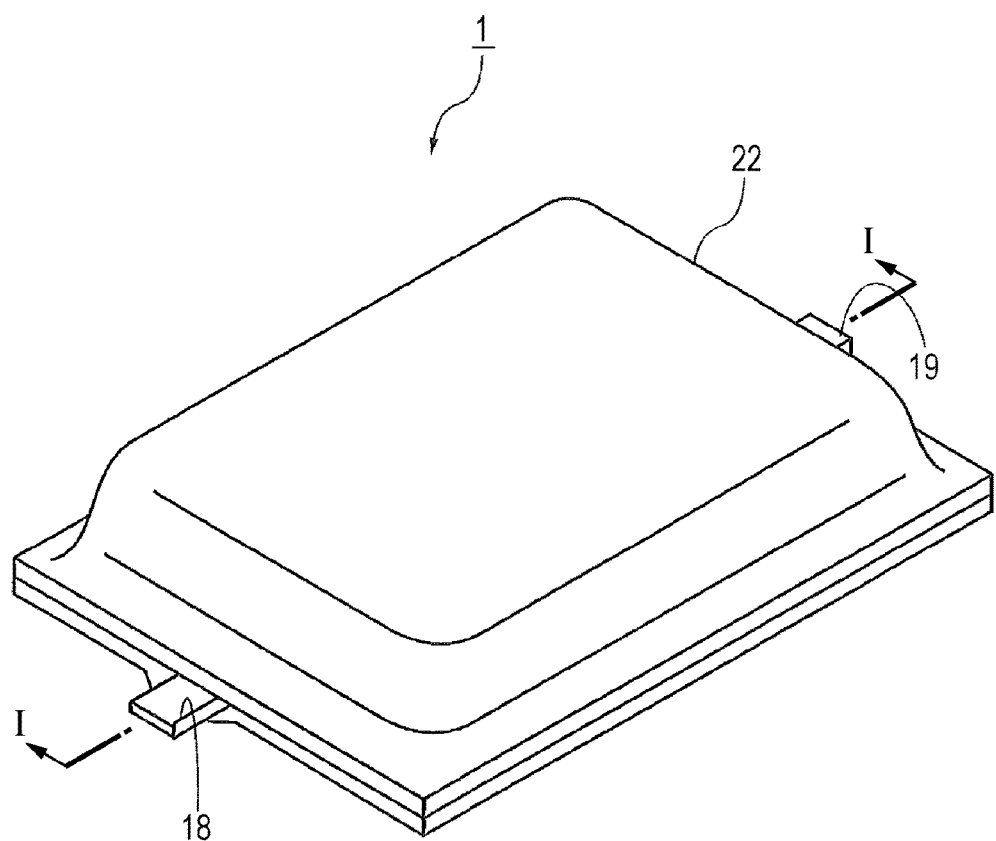
FIG. 1 is a perspective view schematically illustrating a lithium ion secondary battery according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The separator is formed to have a predetermined size by thermally cutting a porous resin. In this formation, the cut end of the porous resin is melted by the heat applied in the thermal cutting and therefore shrunken. This causes at least a part of the pores in the melted portion of the separator to be closed. As a result, the low-porosity region is formed in the separator. However, this shrinkage leads to the unevenness in size of the separator.

The size of the positive electrode and negative electrode is determined in consideration of the maximum value of the unevenness in size of the separator (i.e., the size of the separator when the shrinkage is the maximum). The positive electrode and negative electrode are formed so that the surplus region is secured when the shrinkage is the maximum. In other words, the positive electrode and negative electrode are formed to be smaller as the unevenness in size of the separator is larger.

The capacity per unit volume of the lithium ion secondary battery in the manufacture (hereinafter referred to as "initial capacity") depends on the size of the positive electrode and negative electrode. As the positive electrode and negative electrode are smaller, the lithium ion secondary battery has the lower initial capacity. Accordingly, as the separator varies more in size, the lithium ion secondary battery has the lower initial capacity.

An object of the present disclosure is to provide a lithium ion secondary battery in which the decrease in initial capacity of the lithium ion secondary battery, which is caused by the unevenness in size of the separator, can be suppressed, and to provide a method for manufacturing the lithium ion secondary battery.

According to a first aspect of the present disclosure, a lithium ion secondary battery includes: a positive electrode extending along a first direction; a negative electrode extending along the first direction and disposed opposite to the positive electrode along a second direction orthogonal to the first direction; and a separator with a crosslinked structure, extending along the first direction and provided between the positive electrode and the negative electrode. The separator includes an opposite region opposite to the positive electrode and the negative electrode along the second direction, and a surplus region not opposite to the positive electrode and/or the negative electrode along the second direction, and the surplus region has lower porosity than the opposite region.

According to a second aspect of the present disclosure, a method for manufacturing a lithium ion secondary battery including a positive electrode, a separator, and a negative electrode, the method includes: crosslinking a porous material; forming, by applying heat to the crosslinked porous material, a separator with a crosslinked structure; and stacking sequentially the positive electrode, the separator, and the negative electrode along a second direction so that an end of the separator is not opposite to the positive electrode and/or the negative electrode along the second direction orthogonal to a first direction where the positive electrode extends. A size of the separator with the crosslinked structure in the first direction is larger than a size of the positive electrode and the negative electrode in the first direction.

According to the embodiment of the present disclosure, the decrease in initial capacity of the lithium ion secondary battery caused by the unevenness in size of the separator can be suppressed.

A lithium ion secondary battery according to the present disclosure will hereinafter be described in detail.

(1) Lithium ion Secondary Battery

Figure 2:
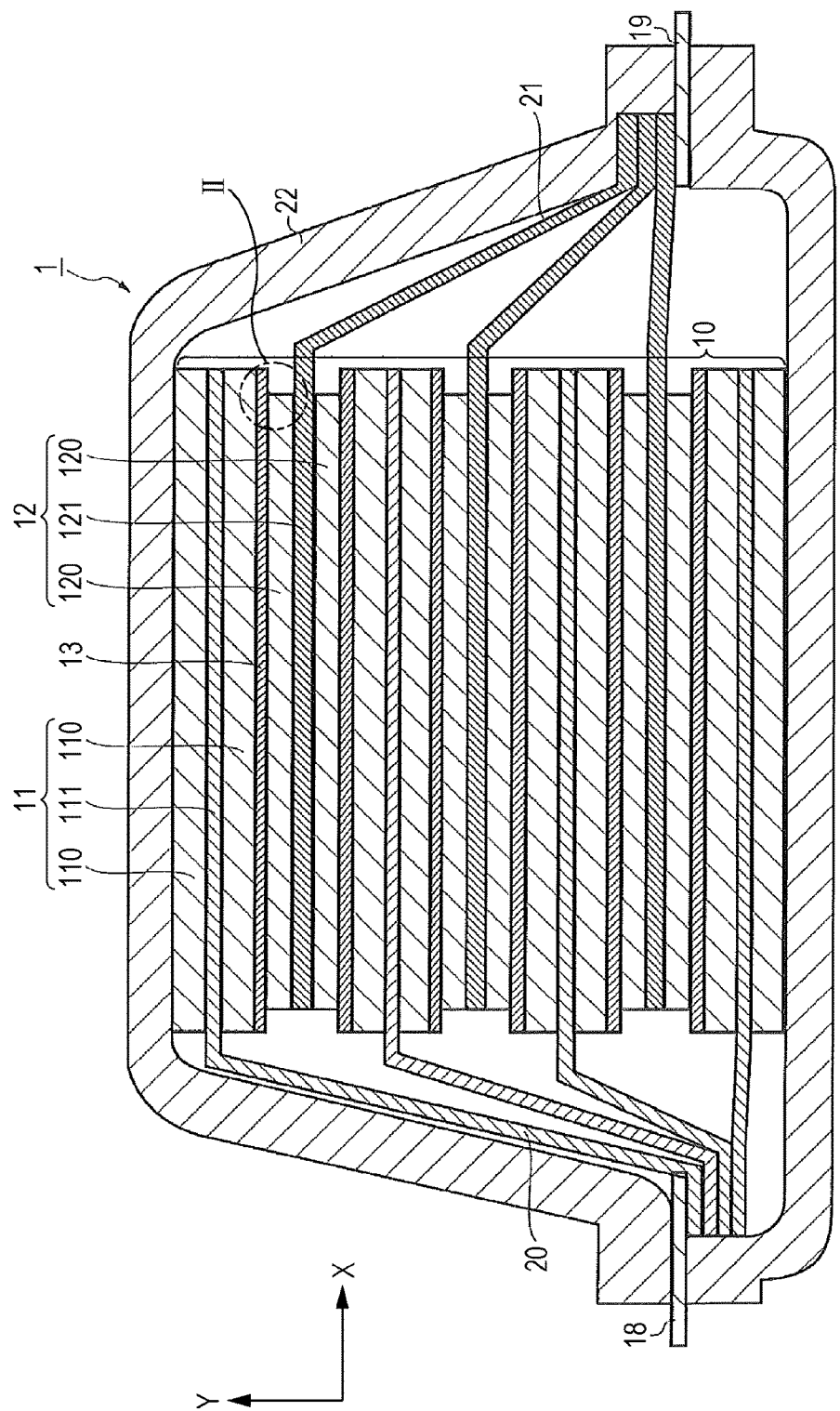
FIG. 2 is a schematic sectional view taken along a line I-I of the lithium ion secondary battery illustrated in FIG. 1.

FIG. 1 is a perspective view schematically illustrating a lithium ion secondary battery according to an embodiment of the present disclosure. FIG. 2 is a schematic sectional view taken along a line I-I of the lithium ion secondary battery illustrated in FIG. 1. The lithium ion secondary battery covered with a laminate film will be described in this embodiment.

As illustrated in FIGS. 1 and 2, a lithium ion secondary battery 1 according to this embodiment has a structure including a laminate film 22 that is a sealed battery exterior material to house an approximately rectangular power generating element 10 for advancing the charging and discharging reaction. More specifically, in this lithium ion secondary battery 1, the peripheral portion of the polymer-metal composite laminate film is entirely bonded through heat-sealing. This allows the power generating element 10 to be housed and sealed in the polymer-metal composite laminate film.

The power generating element 10 includes negative electrodes 11, separators 13, and positive electrodes 12. The negative electrode 11 includes a negative electrode current collector 111, and a negative electrode mixture layer 110 provided for each major surface of the negative electrode current collector 111 (however, on only one plane for the lowermost or uppermost layer of the power generating element). The positive electrode 12 includes a positive electrode current collector 121 and a positive electrode mixture layer 120 provided for each major surface of the positive electrode current collector 121. One negative electrode mixture layer 110 and the positive electrode mixture layer 120 adjacent to this negative electrode mixture layer 110 are disposed opposite to each other with the separator 13 interposed therebetween. That is to say, the negative electrode 11, the separator 13, and the positive electrode 12 are stacked in a stacking direction (Y direction in FIG. 2). The negative electrode 11, the positive electrode 12, and the separator 13 extend in the direction (X direction in FIG. 2) orthogonal to the stacking direction (Y direction). The stacking direction (Y direction) is an example of "a second direction". The direction (X direction) orthogonal to the stacking direction (Y direction) is an example of "a first direction".

Thus, the negative electrode 11, the separator 13, and the positive electrode 12 that are adjacent to each other constitute one unit cell layer. The lithium ion secondary battery 1 according to this embodiment has a structure including a stack of a plurality of unit cell layers (i.e., the structure having the layers electrically connected in parallel). The negative electrode 11 is provided as the outermost layer on each side of the power generating element 10.

The negative electrode current collector 111 and the positive electrode current collector 121 are respectively provided with a negative electrode tab 18 and a positive electrode tab 19 that are electrically connected to the electrodes (the negative electrode 11 and the positive electrode 12). The negative electrode tab 18 and the positive electrode tab 19 are sandwiched between the ends of the laminate films 22, and extend out of the laminate film 22. The negative electrode tab 18 and the positive electrode tab 19 are attached to the negative electrode current collector 111 and the positive electrode current collector 121 of the electrodes through a negative electrode terminal lead 20 and a positive electrode terminal lead 21, respectively through the ultrasonic welding, resistance welding, or the like. Note that the negative electrode current collector 111 and the negative electrode tab 18 may be integrated. In other words, the negative electrode current collector 111 may be sandwiched between the ends of the laminate films 22, and extend out of the laminate film 22. Alternatively, the positive electrode current collector 121 and the positive electrode tab 19 may be integrated. In other words, the positive electrode current collector 121 may be sandwiched between the ends of the laminate films 22, and extend out of the laminate film 22.

The members included in the lithium ion secondary battery according to this embodiment will hereinafter be described.

(1-1) Positive Electrode and Negative Electrode (1-1-1) Current Collector

The current collector is formed of a conductive material. An active material layer is provided for each surface of the current collector. The current collector forms the electrode of the battery.

The material for the current collector is not particularly limited. The preferable material used for the current collector is a material made of metal. Examples of such a material include aluminum, nickel, iron, stainless steel, titanium, and copper. The material for the current collector may be, for example, a clad material of nickel and aluminum, a clad material of copper and aluminum, a plating material formed by the combination thereof, or a foil with a metal surface coated with aluminum. The particularly preferable materials from the perspective of the electron conductivity and the battery operation potential are aluminum, stainless steel, and copper.

The size of the current collector is determined in accordance with the intended purpose of the battery. For example, in the case of the large battery required to have high capacity, the current collector with a large area is used. The thickness of the current collector is not particularly limited, but is usually approximately 1 to 100 µm.

(1-1-2) Positive Electrode Mixture Layer

The positive electrode mixture layer 120 includes a positive electrode active material. The positive electrode active material has a composition that intercalates ions in the discharging and deintercalates ions in the charging. Examples of the positive electrode active material include a lithium-transition metal composite oxide as the composite oxide of transition metal and lithium. Specific examples of the lithium-transition metal composite oxide include Li—Co composite oxide such as $LiCoO_2$, Li—Ni composite oxide such as $LiNiO_2$, Li—Mn composite oxide with a spinel structure such as $LiMn_2O_4$, Li—Fe composite oxide such as $LiFeO_2$, and a composite oxide obtained by replacing a part of the above transition metal with another element. These lithium-transition metal composite oxides are inexpensive and have excellent reactivity and cycle characteristics.

Therefore, by the use of these materials, the output characteristics of the battery can be improved. Examples of the positive electrode active material include: a phosphate compound or a sulfate compound, which includes a transition metal and lithium, such as $LiFePO_4$; an oxide or a sulfide of a transition metal, such as $V_2O_5$, $MnO_2$, $TiS_2$, $MoS_2$, or $MoO_3$; $PbO_2$; AgO; or NiOOH. The positive electrode active material may employ one kind of the above materials or a mixture of two or more of those.

The average particle diameter of the positive electrode active material is preferably 1 to 100 μm, more preferably 1 to 20 μm, from the viewpoint of the capacity increase, reactivity, and cycle durability of the positive electrode active material. When the average particle diameter of the positive electrode active material is in this range, the increase in internal resistance of the lithium ion secondary battery in the charging and discharging under high-output condition is suppressed. For this reason, such a lithium ion secondary battery can provide the sufficiently large current.

If the positive electrode active material is formed of secondary particles, the average particle diameter of the primary particles included in the secondary particles is preferably 10 nm to 1 μm. Depending on the manufacturing method, the primary particles of the positive electrode active material do not need to constitute the secondary particles due to condensation or bulk. In this case, the median size obtained by a laser diffraction method can be used as the particle diameter of the positive electrode active material and the particle diameter of the primary particle.

Depending on the kind of, and the manufacturing method for the positive electrode active material, the shape of the active material is different. Examples of the possible shape of the positive electrode active material are spherical (powder-like), plate-like, needle-like, columnar, and rectangular. Preferably, the optimum shape of the positive electrode active material that can improve the battery characteristics such as the charging and discharging characteristics is selected as appropriate.

(1-1-3) Negative Electrode Mixture Layer

The negative electrode mixture layer 110 includes the negative electrode active material. The negative electrode active material has a composition that deintercalates ions in the discharging and intercalates ions in the charging. The negative electrode active material may be any material that can reversibly intercalate or deintercalate lithium ions. Examples of the preferable negative electrode active material include metal (such as Si and Sn), metal oxides (such as TiO, $Ti_2O_3$, $TiO_2$, $SiO_2$, SiO, and $SnO_2$), composite oxides of lithium and transition metal (such as $Li_{4/3}Ti_{5/3}O_4$ and $Li_7MnN$), Li—Pb alloy, Li—Al alloy, lithium, carbon materials (such as natural graphite, synthetic graphite, carbon black, activated carbon, carbon fiber, cokes, soft carbon, and hard carbon), and the combination of any of these.

The particle diameter and shape of the negative electrode active material are not particularly limited, and the negative electrode active material may have various modes.

If necessary, the active material layer may include other materials (such as a conductive auxiliary agent and binder). If the active material layer includes the ion-conductive polymer, the active material layer may include a polymerization initiator for forming the polymer.

The conductive auxiliary agent is an additive that is mixed in order to improve the conductivity of the active material layer. Examples of the conductive auxiliary agent include carbon powder (acetylene black, carbon black, Ketjen black, graphite, etc.), carbon fiber (vapor grown carbon fiber (VGCF (registered trademark)), etc.) and expanded graphite.

Examples of the binder include polyvinylidene fluoride (PVdF), polyimide, PTFE, SBR, and synthetic rubber binder.

The mixing ratio of the components included in the active material layer may be adjusted as appropriate in accordance with the public knowledge on the lithium ion secondary batteries. The thickness of the active material layer may be determined as appropriate in accordance with the public knowledge on the lithium ion secondary batteries. The thickness of the active material layer is preferably approximately 10 to 100 μm, more preferably 20 to 50 μm. When the active material layer has a thickness of 10 μm or more, the battery capacity can be sufficiently secured. On the other hand, when the active material layer has a thickness of approximately 100 μm or less, the diffusion of lithium ions to the deep part of the electrode (current collector side) can be suppressed. Therefore, the increase in internal resistance of the lithium ion secondary battery can be suppressed.

(1-1-4) Separator

The separator has a function of holding an electrolyte solution for securing the lithium ion conduction between the positive electrode and the negative electrode, and a function of preventing the short-circuiting between the positive electrode and the negative electrode. The electrolyte solution may be either liquid or gel. The separator used in the lithium ion secondary battery according to the embodiment has a small heat shrinkage ratio. The heat shrinkage ratio of the separator is preferably 15% or less, more preferably 7% or less, and the most preferably 2% or less. The heat shrinkage ratio can be measured by a method described below.

A method for manufacturing the separator used for the lithium ion secondary battery according to the embodiment is described.

First, the porous material that can absorb, hold, or carry the electrolyte (especially electrolyte solution) is prepared as the material for the separator. The porous material is formed by, for example, making the resin material such as polyolefin porous. Polyolefin is polypropylene or polyethylene, for example. The resin material can be made porous by, for example, being stretched.

Next, the porous material is irradiated with a predetermined amount of electron beam, so that the porous material is crosslinked.

Then, the crosslinked porous material is thermally cut so that the material has a size larger in the direction (X direction) orthogonal to the stacking direction (Y direction) than the size of the positive electrode 12 and negative electrode 11 in the X direction. In the thermal cutting, for example, a hot blade with a temperature of 200° C. is used. With this thermal cutting, heat is applied to the cut end of the porous material, so that at least a part of the pores of the porous material is closed. This makes the porous material have the high-porosity region and the low-porosity region. The pores closer to the cut end are closed easily (i.e., more pores are closed near the cut end). Therefore, the porosity is lower at the location closer to the cut end. Note that "porosity" refers to the ratio of the pore volume per unit volume of the porous material apparently.

Through the above process, the separator 13 including the high-porosity region and the low-porosity region and having the crosslinked structure (hereinafter referred to as "crosslinked separator") is obtained.

After the separator 13 is obtained, the positive electrode 12, the separator 13, and the negative electrode 11 are stacked. Specifically, the positive electrode 12, the separator 13, and the negative electrode 11 are stacked sequentially in the stacking direction (Y direction) so that the end of the separator (i.e., the thermally cut end of the porous material) does not come opposite to the positive electrode 12 and/or the negative electrode 11 in the stacking direction (Y direction). In other words, the separator 13 is disposed between the positive electrode 12 and the negative electrode 11 so that the low-porosity region forms the region (surplus region) that is not opposite to at least one of the positive electrode 12 and the negative electrode 11. In other words, the separator 13 is disposed to protrude beyond at least one of the positive electrode 12 and the negative electrode 11.

Through the above process, the stacked type power generating element 10 as illustrated in FIG. 2 is obtained.

(1-1-5) Electrolyte

For the electrolyte to be absorbed, held, or carried by the separator, the liquid electrolyte (also called "electrolyte solution") or the polymer gel electrolyte can be used.

(1-1-5-1) Liquid Electrolyte

The liquid electrolyte is obtained by dissolving a lithium salt as the support salt in a solvent. Examples of the solvent include dimethyl carbonate (DMC), diethyl carbonate (DEC), dipropyl carbonate (DPC), ethyl methyl carbonate (EMC), methyl propionate (MP), methyl acetate (MA), methyl formate (MF), 4-methyl dioxolane (4MeDOL), dioxolane (DOL), 2-methyl tetrahydrofuran (2MeTHF), tetrahydrofuran (THF), dimethoxy ethane (DME), ethylene carbonate (EC), propylene carbonate (PC), butylene carbonate (BC), γ-butyrolactone (GBL), and a combination of any of these.

Examples of the support salt (lithium salt) include inorganic acid negative ion salt (such as $LiPF_6$, $LiBF_4$, $LiClO_4$, $LiAsF_6$, $LiTaF_6$, $LiSbF_6$, $LiAlCl_4$, $Li_2B_{10}Cl_{10}$, LiI, LiBr, LiCl, LiAlCl, $LiHF_2$, or LiSCN), organic acid negative ion salt (such as $LiCF_3SO_3$, $Li(CF_3SO_2)_2N$, LiBOB (lithium-bisoxide borate), LiBETI (lithium bis(perfluoroethylenesulfonylimide) (also referred to as $Li(C_2F_5SO_2)_2N$), and a combination thereof.

(1-1-5-2) Polymer Gel Electrolyte

The polymer gel electrolyte is obtained by dispersing or swelling the liquid electrolyte in a matrix polymer. If the polymer gel electrolyte is used as the electrolyte, the pores of the separator are filled with the polymer gel electrolyte. Examples of the matrix polymer include the following polymers:

polymer with polyethylene oxide in a main chain or side chain (PEO);

polymer with polypropylene oxide in a main chain or side chain (PPO); and polyethylene glycol (PEG), polyester methacrylate, polyvinylidene fluoride (PVdF), a copolymer of polyvinylidene fluoride and hexafluoropropylene (PVdF-HFP), polyacrylonitrile (PAN), poly(methylacrylate) (PMA), poly(methylmethacrylate) (PMMA), a mixture, a modified body, a derivative, a random copolymer, an alternate copolymer, a grafted copolymer, a block copolymer and other polymers with a mesh structure including any of these polymers. Among the above polymers, PEO, PPO, the copolymer thereof, PVdF, and PVdF-HFP are preferable. The electrolyte salt such as lithium salt is dissolved well in such matrix polymers.

(1-2) Tab

As illustrated in FIGS. 1 and 2, the tabs electrically connected to the current collectors (positive electrode tab 19 and negative electrode tab 18) extend out of the laminate film 22. Through these tabs, current is extracted out of the lithium ion secondary battery 1.

The material for the tab is the highly conductive material (preferably a metal material such as aluminum, copper, titanium, nickel, stainless steel (SUS), or alloy thereof). From the viewpoint of lightness in weight, corrosion resistance, and high conductivity, the material is more preferably aluminum and copper, particularly preferably aluminum. Note that the material for the positive electrode tab 19 and the material for the negative electrode tab 18 may be either the same or different.

(1-3) Positive Electrode Terminal Lead and Negative Electrode Terminal Lead

As illustrated in FIGS. 1 and 2, the negative electrode current collector 111 and the positive electrode current collector 121 are electrically connected to the positive electrode tab 19 and the negative electrode tab 18 through the negative electrode terminal lead 20 and the positive electrode terminal lead 21, respectively.

The positive electrode terminal lead 21 and the negative electrode terminal lead 20 may employ the material similar to the material used for the leads of the known lithium ion secondary battery.

(1-4) Exterior Material

The exterior material has a function of housing the power generating element 10 by sealing. As illustrated in FIG. 1, the exterior material may be, for example, the laminate film 22. The laminate film 22 has, for example, a three-layer structure in which polypropylene, aluminum, and nylon are stacked in this order. The exterior material may be a metal can case.

(2) Shape Of End Of Power Generating Element

Figure 3:
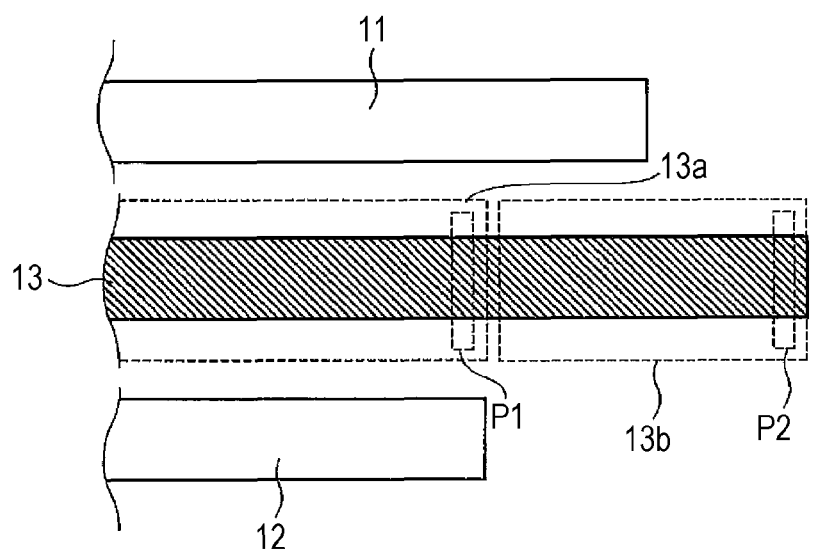
FIG. 3 is a magnified view illustrating a portion surrounded by a line II of FIG. 2.

The shape of the end of the power generating element according to this embodiment will be described with reference to FIG. 3. FIG. 3 is a magnified view of the portion surrounded by the line II in FIG. 2.

As illustrated in FIG. 3, the separator 13 includes an opposite region 13a and a surplus region 13b at the end of the power generating element 10. The opposite region 13a is a region opposite to the positive electrode 12 and the negative electrode 11 with respect to the stacking direction (Y direction). The opposite region 13a is an example of "a first region opposite to the positive electrode and the negative electrode along the second direction." The surplus region 13b is a region including the portion not opposite to the positive electrode 12 but opposite to the negative electrode 11. The surplus region 13b is an example of "a second region not opposite to the positive electrode and/or the negative electrode with respect to the second direction."

In the thermal cutting, heat is applied to the cut end of the separator 13 (i.e., the end of the separator 13) according to this embodiment. Accordingly, the porosity of the region near the cut end (especially the surplus region 13b) is lower than the porosity of the region away from the cut end (especially the opposite region 13a). This can suppress the phenomenon that the electrolyte solution held by the opposite region 13a moves to the surplus region 13b, and therefore suppress the decrease in capacity along the use of the battery.

The separator 13 according to this embodiment is formed of the material irradiated with the electron beam (i.e., the crosslinked material). Therefore, the shrinkage by the melting is small and accordingly the unevenness in size of the cut end is also small. With the use of the separator 13 that varies less in size, the difference between the size of the electrode (positive electrode 12 and/or negative electrode 11) and the size of the separator 13 can be reduced. In other words, the surplus region 13b can be made small. Thus, the decrease in initial capacity of the lithium ion secondary battery due to the unevenness in size of the separator can be suppressed.

(3) Examples And Comparative Example Of Embodiment

Figure 4A:
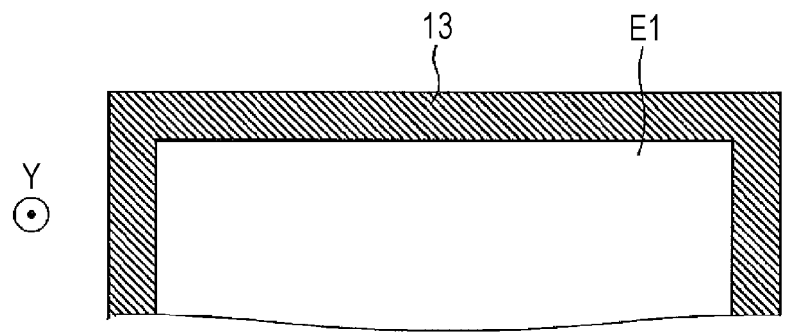
FIG. 4A is a magnified view illustrating an end of a separator according to Example 1.
Figure 4B:
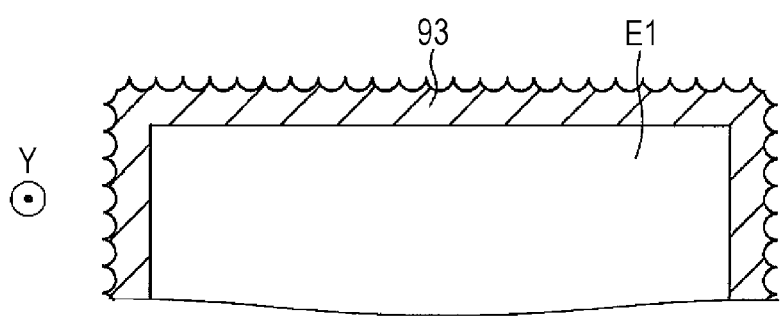
FIG. 4B is a magnified view illustrating an end of a separator according to Comparative Example.

Next, Examples and Comparative Examples of the embodiment will be described. FIG. 4A is a plan view of a power generating element according to Example 1 of the embodiment in the Y direction, and FIG. 4B is a plan view of a power generating element according to Comparative Example of the embodiment in the Y direction.

As shown in Table 1, four porous materials were prepared in Examples (Examples 1 to 3) and Comparative Example. The porous material was formed by making polypropylene resin porous through stretching (hereinafter this porous material is referred to as "PP porous material"). Next, out of the four porous materials, three PP porous materials used in Examples 1 to 3 were irradiated with a different amount of electron beam (i.e., crosslinked). The other one PP porous material used in Comparative Example was not irradiated with the electron beam (i.e., not crosslinked). Next, two kinds of samples (Samples 1 and 2) were extracted from each PP porous material. Sample 1 was obtained by cutting the PP porous material with a machine, while heat was not applied thereto. Sample 2 was obtained by cutting the PP porous material with a hot blade with a temperature of 200° C. Next, the heat shrinkage ratio of Sample 1 after being placed under the high-temperature environment for a certain period of time, and the values of unevenness in size of the cut end, the porosity of the opposite region, and the porosity of the cut end of Sample 2 were examined.

The heat shrinkage ratio was calculated as below. First, the size of Sample 1 (hereinafter called "initial size") was obtained. Next, the size of this Sample 1 after being placed for an hour in a 150° C. atmosphere (hereinafter called "after-change size") was obtained. Then, the difference between the initial size and the after-change size of Sample 1 (hereinafter called "change quantity") was obtained. Next, the rate of the change quantity relative to the initial size of Sample 1 was calculated as the heat shrinkage ratio. The heat shrinkage ratio of Sample 1 after being placed under the high-temperature environment was examined for the purpose of obtaining the value representing the alternative characteristics of the crosslinking degree of the PP porous material. The polypropylene resin of Sample 1 was formed by stretching, and therefore, thermal shrinkage occurs even below the melting point if the exposure is long at high temperature. The degree of thermal shrinkage is smaller as the crosslinking degree of the PP porous material is larger.

TABLE 1

| | Sample 1 | Sample 2 | | |
|---|---|---|---|---|
| | Thermal shrinkage ratio | Variation in size of cut end | Porosity of opposite region | Porosity of cut end |
| Example 1 | 1% | 0.02 mm | Approximately 50% | Approximately 0% |
| Example 2 | 3% | 0.05 mm | Approximately 50% | Approximately 0% |
| Example 3 | 10% | 0.08 mm | Approximately 50% | Approximately 0% |
| Comparative Example | 20% | 0.30 mm | Approximately 50% | Approximately 0% |

(3-1) Example 1

The PP porous material according to Example 1 was irradiated with a predetermined amount of electron beam (i.e., crosslinked). The separator according to Example 1 was the crosslinked separator obtained by cutting the crosslinked PP porous material with a hot blade with a temperature of 200° C. In Example 1, the heat shrinkage ratio of Sample 1 after being placed for an hour at 150° C. was 1% and the unevenness in size of the cut end of Sample 2 was 0.02 mm. In Example 1, the porosity of the region (for example, region P1 in FIG. 3) positioned at 2 mm away from the cut end of Sample 2 was approximately 50%, and the porosity of the region (for example, region P2 in FIG. 3) positioned at 0.1 mm away from the cut end of Sample 2 was approximately 0%.

(3-2) Example 2

The PP porous material according to Example 2 was irradiated with a smaller amount of electron beam (i.e., crosslinked) than that in Example 1. The separator according to Example 2 was the crosslinked separator obtained by cutting the crosslinked PP porous material with a hot blade with a temperature of 200° C. In Example 2, the heat shrinkage ratio of Sample 1 after being placed for an hour at 150° C. was 3% and the unevenness in size of the cut end of Sample 2 was 0.05 mm. In Example 2, the porosity of the region (for example, region P1 in FIG. 3) positioned at 2 mm away from the cut end of Sample 2 was approximately 50%, and the porosity of the region (for example, region P2 in FIG. 3) positioned at 0.1 mm away from the cut end of Sample 2 was approximately 0%. In Example 2, the heat shrinkage ratio of Sample 1 and the unevenness in size of the cut end of Sample 2 were larger than those in Example 1.

(3-3) Example 3

The PP porous material according to Example 3 was irradiated with a smaller amount of electron beam (i.e., crosslinked) than that in Example 2. The separator according to Example 3 was the crosslinked separator obtained by cutting the crosslinked PP porous material with a hot blade with a temperature of 200° C. In Example 3, the heat shrinkage ratio of Sample 1 after being placed for an hour at 150° C. was 10% and the unevenness in size of the cut end of Sample 2 was 0.08 mm. In Example 3, the porosity of the region (for example, region P1 in FIG. 3) positioned at 2 mm away from the cut end of Sample 2 was approximately 50%, and the porosity of the region (for example, region P2 in FIG. 3) positioned at 0.1 mm away from the cut end of Sample 2 was approximately 0%. In Example 3, the heat shrinkage ratio of Sample 1 and the unevenness in size of the cut end of Sample 2 were larger than those in Examples 1 and 2.

(3-4) Comparative Example

The PP porous material according to Comparative Example was not irradiated with the electron beam (i.e., not crosslinked). The separator according to Comparative Example was the non-crosslinked separator obtained by cutting the non-crosslinked PP porous material with a hot blade with a temperature of 200° C. In Comparative Example, the heat shrinkage ratio of Sample 1 after being placed for an hour in the 150° C. atmosphere was 20% and the unevenness in size of the cut end of Sample 2 was 0.30 mm. In Comparative Example, the porosity of the region positioned at 2 mm away from the cut end of Sample 2 was approximately 50%, and the porosity of the region positioned at 0.1 mm away from the cut end of Sample 2 was approximately 0%. In Comparative Example, the heat shrinkage ratio of Sample 1 and the unevenness in size of the cut end of Sample 2 were remarkably larger than those in Examples 1 to 3.

(3-5) Summary of Examples and Comparative Example of Embodiment

The summary of Examples and Comparative Example of the embodiment will be described. FIG. 4A is a plan view schematically illustrating the cut end of the separator according to Example 1 of the embodiment, and FIG. 4B is a plan view schematically illustrating the cut end of the separator according to Comparative Example of the embodiment.

It has been found that the crosslinked porous material after being placed for a predetermined period of time under the high-temperature environment has the smaller heat shrinkage ratio than the non-crosslinked porous material. Moreover, it has been found that the crosslinked separator has the smaller unevenness in size of the cut end in the thermal cutting than the non-crosslinked separator. In particular, it has been found that as the porous material is irradiated with a larger amount of electron beam, the porous material has the smaller heat shrinkage ratio and the separator formed of such a porous material has the smaller unevenness in size of the cut end. It is considered that this is because the shrinkage of the material due to the melting of the porous material in the thermal cutting is suppressed by the crosslinking. For example, as illustrated in FIG. 4A, the roughness is not observed in the cut end of the separator (i.e., crosslinked separator) 13 according to Example 1. On the other hand, as illustrated in FIG. 4B, the roughness is observed in the cut end of a separator (i.e., non-crosslinked separator) 93 according to Comparative Example. It is considered that this is because the shrinkage has remarkably occurred by the melting of the non-crosslinked PP porous material in the thermal cutting.

As described above, with the crosslinked separator according to the embodiment, the high-porosity region and the low-porosity region can be formed and the processing accuracy of the cut end (i.e., the end of the separator) can be improved. This can suppress the decrease in initial capacity of the lithium ion secondary battery due to the unevenness in size of the separator. Moreover, as described above, the phenomenon that the electrolyte solution held by the opposite region 13a moves to the surplus region 13b can be suppressed according to the embodiment. Thus, the decrease in capacity along the use of the battery can be suppressed. With the combined effect from the suppressed decrease in capacity along the use of the battery and the suppressed decrease in initial capacity, it is possible to provide the lithium ion secondary battery still having a high capacity even after the long use. The unevenness in size of the cut end can be suppressed regardless of whether the electrolyte solution in the separator 13 moves to the surplus region or not. That is, the above effect can be obtained regardless of whether the electrolyte solution in the separator 13 moves to the surplus region or not.

(4) Modified Examples Of The Embodiment

Modified examples of the embodiment will be described.

(4-1) Modified Example 1

Figure 5:
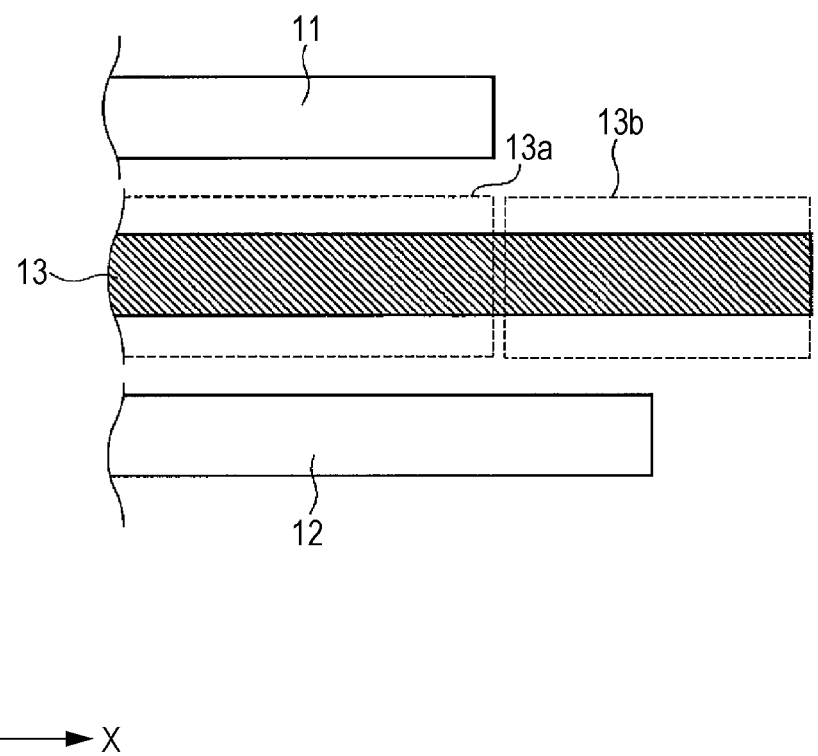
FIG. 5 is a diagram corresponding to FIG. 3 according to another embodiment of the present disclosure.

In this embodiment, the case in which the negative electrode 11 is larger than the positive electrode 12 (i.e., the surplus region 13b of the separator 13 is not opposite to the positive electrode 12 but is opposite to the negative electrode 11) has been described. In contrast to this, the case in which the positive electrode 12 is larger than the negative electrode 11 (i.e., the surplus region 13b of the separator 13 is not opposite to the negative electrode 11 but is opposite to the positive electrode 12) is described in Modified Example 1. FIG. 5 is a magnified view of the portion surrounded by the line II in FIG. 2 in Modified Example 1 of the embodiment.

As illustrated in FIG. 5, the separator 13 includes the opposite region 13a opposite to the positive electrode 12 and the negative electrode 11 along the stacking direction (Y direction) and the surplus region 13b including the portion not opposite to the negative electrode 11 but opposite to the positive electrode 12 at the end of the power generating element 10 in Modified Example 1.

According to Modified Example 1, the effect similar to that of the embodiment can be obtained even if the positive electrode 12 is larger than the negative electrode 11.

(4-2) Modified Example 2

The example in which the high-porosity region and the low-porosity region are formed by thermally cutting the porous material has been described in this embodiment. In contrast to this, an example in which the high-porosity region and the low-porosity region are formed by cutting the porous material without using the hot blade and then heating the porous material is described in Modified Example 2.

In Modified Example 2, the porous material is physically cut with a cutter, instead of thermally cutting the crosslinked porous material. Next, the cut porous material is locally heated to be melted. For example, a high-temperature object may be brought into contact with the cut porous material. Alternatively, the porous material may be exposed to hot air locally. As a result, the high-porosity region and the low-porosity region are formed in the porous material in a manner similar to the embodiment.

Through the above process, the crosslinked separator including the high-porosity region and the low-porosity region can be obtained without thermally cutting the crosslinked porous material.

In Modified Example 2, the porous material is melted when the porous material is heated. However, since the porous material is crosslinked, the shrinkage caused by the melting can be suppressed in a manner similar to the embodiment. Thus, the unevenness in size of the separator is suppressed.

(4-3) Modified Example 3

The stacked type power generating element has been described in this embodiment. However, the effect similar to that of the embodiment can be provided even when the separator protrudes beyond at least one of the positive electrode and the negative electrode of the power generating element other than the stacked type (for example, wound type).

(4-4) Modified Example 4

The example of crosslinking the porous material by irradiating the porous material with the electron beam has been described in this embodiment. However, the method for crosslinking the porous material is not limited thereto. For example, the porous material made of the resin including the dispersed crosslinking agent on the inside and/or surface may be irradiated with the electron beam or UV ray. Further, heat may be applied to the porous material made of the resin including the dispersed crosslinking agent on the inside and/or surface.

The embodiment and the modified examples merely represent some examples of the embodiment of the present disclosure. The content thereof does not limit the technical scope of the present invention to the specific structure of the embodiment. For example, the material, shape, and size (area, thickness, etc.) of the members included in the lithium ion secondary battery 1 according to the embodiment are not limited to those in the above embodiment.

The lithium ion secondary battery according to the embodiment of the present disclosure may be a lithium ion secondary battery including: a positive electrode extending along a first direction; a negative electrode extending along the first direction and disposed opposite to the positive electrode along a second direction orthogonal to the first direction; and a separator with a crosslinked structure, extending along the first direction and provided between the positive electrode and the negative electrode, wherein: the separator includes a first region opposite to the positive electrode and the negative electrode with respect to the second direction, and a second region not opposite to the positive electrode and/or the negative electrode with respect to the second direction; and the first region has a first porosity and the second region has a second porosity lower than the first porosity.

The method for manufacturing a lithium ion secondary battery according to the present disclosure may be any of the following first to third methods for manufacturing a lithium ion secondary battery.

The first method for manufacturing a lithium ion secondary battery is a method for manufacturing a lithium ion secondary battery including a positive electrode, a separator, and a negative electrode, the method including: a step of crosslinking a porous material; a step of forming a separator with a crosslinked structure by heating the crosslinked porous material so that a size with respect to a first direction becomes larger than the positive electrode and the negative electrode; and a step of stacking sequentially the positive electrode, the separator, and the negative electrode so that an end of the separator is not opposite to the positive electrode and/or the negative electrode with respect to a second direction orthogonal to the first direction.

The second method for manufacturing a lithium ion secondary battery is the first method for manufacturing a lithium ion secondary battery, wherein the step of forming the separator includes thermally cutting the crosslinked porous material.

The third method for manufacturing a lithium ion secondary battery is the first method for manufacturing a lithium ion secondary battery, wherein the step of forming the separator includes cutting the crosslinked porous material and heating the cut porous material.

The foregoing detailed description has been presented for the purposes of illustration and description. Many modifications and unevenness are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising:
a positive electrode extending along a first direction;
a negative electrode extending along the first direction and disposed opposite to the positive electrode along a second direction orthogonal to the first direction; and
a separator with a crosslinked structure, extending along the first direction and provided between the positive electrode and the negative electrode, comprising:
an opposite region disposed between the positive electrode and the negative electrode along the second direction; and
a surplus region extending beyond both the positive electrode and the negative electrode along the second direction and partially contacts only one of the positive electrode and the negative electrode along the second direction,
wherein the surplus region has lower porosity than the opposite region.

2. A method for manufacturing a lithium ion secondary battery including a positive electrode, a separator, and a negative electrode, the method comprising:
crosslinking a porous material;
forming, by applying heat to the crosslinked porous material, a separator with a crosslinked structure;
stacking sequentially the positive electrode, the separator, and the negative electrode along a second direction;
positioning an end of the separator having low-porosity to extend beyond both of the positive electrode and the negative electrode along the second direction orthogonal to a first direction where the positive electrode extends; and
partially contacting the end of the separator having low-porosity to only one of the positive electrode and the negative electrode along the second direction,
wherein a size of the separator with the crosslinked structure in the first direction is larger than a size of the positive electrode and the negative electrode in the first direction.

3. The method for manufacturing a lithium ion secondary battery according to claim 2, wherein the step of forming the separator includes thermally cutting the crosslinked porous material.

4. The method for manufacturing a lithium ion secondary battery according to claim 2, wherein the step of forming the separator includes cutting the crosslinked porous material and heating the cut porous material.

* * * * *